Jan. 2, 1951     R. G. WEYANT     2,536,335
VENEER PRESS

Filed Aug. 28, 1944     3 Sheets-Sheet 1

INVENTOR.
Romer G. Weyant.
BY Gray and Smith
ATTORNEYS.

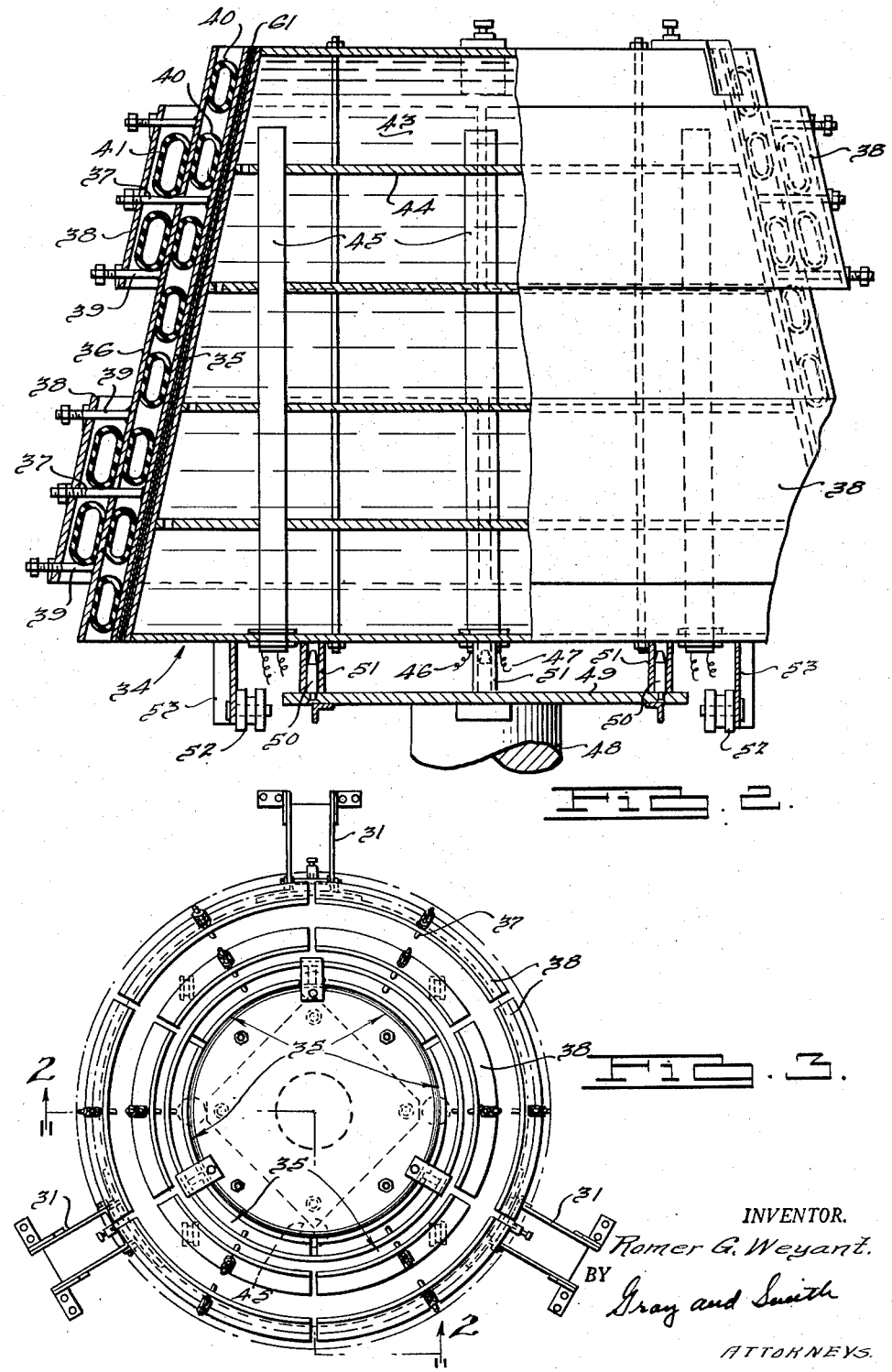

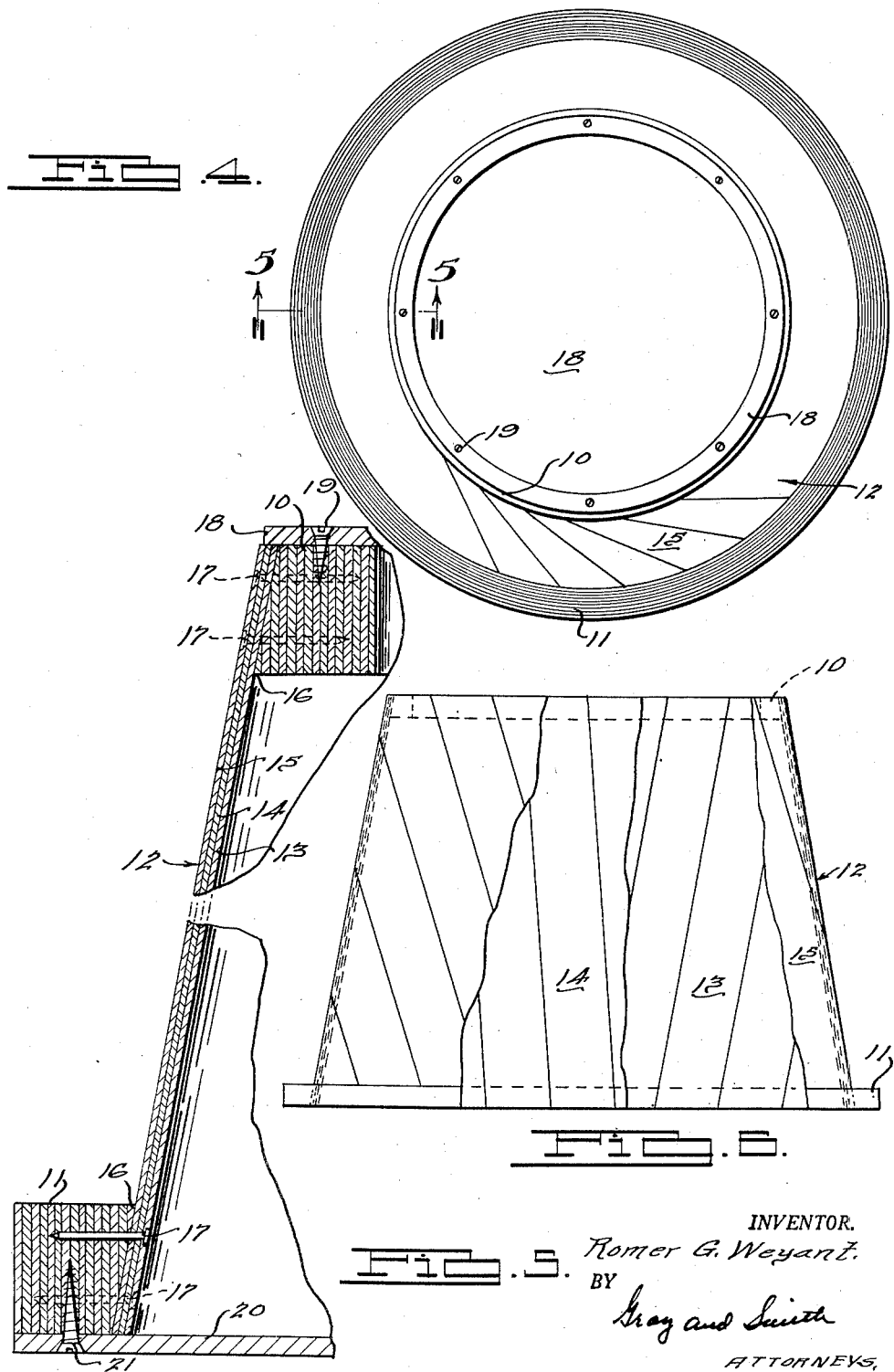

Patented Jan. 2, 1951

2,536,335

UNITED STATES PATENT OFFICE 2,536,335

VENEER PRESS

Romer G. Weyant, Goshen, Ind., assignor to Superior Industries, Incorporated, Goshen, Ind., a corporation of Indiana Application August 28, 1944, Serial No. 551,485

4 Claims. (Cl. 144—281)

The present invention relates to the molding of veneer structures, such for example as molded plywood, in which superimposed laminated layers are bonded together with thermo-setting or thermo-plastic resin adhesives. More particularly, the present invention relates to a novel method and apparatus for molding such structures utilizing a heated mandrel and a sectional die having rigid pressure applying surfaces. The mandrel conforming to the interior surface contour, and the die conforming to the exterior surface contour desired in the finished molded structure.

Among the principal objects of the present invention are:

1. To provide a novel method and apparatus for producing molded structures of superimposed laminations bonded together by heat and pressure fused adhesives and in which the heat and pressure is applied through rigid surfaces having fixed contours.

2. To provide molded structures of superimposed laminations which have high resistance to changes due to moisture and temperature variations, improved strength-weight ratios, and elasticity, because of the novel fabrication thereof in the apparatus herein disclosed when used according to the method of the present invention.

3. To provide a novel method and apparatus for molding structures from superimposed laminations, particularly thin sheets of wood or other flexible fibrous materials, impregnated with a thermo-setting or thermo-plastic resin adhesive, and in which the said laminations and adhesives are fused by the application of heat and pressure to form an integrated structure, either with or without the addition of reinforcing members.

4. To provide a novel method and apparatus for molding resin bonded plywood structures utilizing a plurality of superimposed thin wood veneer laminations bonded together between rigid heat and pressure applying surfaces by heat fused resins to provide a unitary structure having high strength-weight ratios, a high degree of resistance to thermal changes, and substantially complete imperviousness to moisture.

5. To provide a novel method and apparatus for molding laminar structures utilizing heat and pressure applied through rigid segmental surfaces by which the pressures if desired may be selectively applied at variable times and in separately controlled amounts to allow the application of varying pressures to the molded structure over predetermined areas and during predetermined times in the course of the molding or curing operation.

6. To provide a novel method and apparatus for molding laminar structures in which the bonding time is reduced over that required for comparable operations using a flexible pressure applying member, the method and apparatus of the present invention permitting the use of substantially greater pressures during the molding operation than can be used satisfactorily with flexible pressure applying members.

7. To provide a novel method and apparatus for molding laminar structures utilizing heat and pressure applied through rigid surfaces and in which the heat and pressure are separately applied to the laminar structures through rigid male and rigid segmental female die members.

8. To provide a novel method and apparatus for molding laminar structures utilizing heat and pressure applied through rigid surfaces and in which the heating of the laminar structure during the bonding process is controlled independently of the application of pressures thereto to provide a uniform heating of the said structure within predetermined limits.

9. To provide a novel method and apparatus for molding laminar structures utilizing heat and pressure applied through rigid surfaces and in which the rigid die elements have predetermined surface contours which are utilized to apply heat and pressure to predetermined areas of the laminar structure during the molding thereof.

The present invention is related to my United States Letters Patent No. 2,417,226 of March 11, 1947, and entitled "Device for Molding of Veneer Structures."

Prior to the present invention and to the inventiond disclosed in said co-pending application, a method commercially used in the manufacture of laminar structures from resin impregnated thin wood veneers; utliized a flexible bag, sheet or curtain which was pressed by fluid pressure into contact with the surfaces of the laminated structure. The fluid pressure usually was exerted by steam or other heated fluid medium in a pressure autoclave. The pressure applying medium also supplied the heat units which were required to effect a cure of the adhesive or a fusion of the thermo-setting or thermo-plastic resin binder. The use of such methods required a relatively long curing cycle which varied with the types of adhesive or binder employed, the thickness of the laminated sections and the like. In a typical instance using a phenol formaldehyde resin as the binder, a curing cycle was ten minutes, using a temperature of from approximately 280 to 300 degrees F. and pressures of approximately 200 pounds per square inch. Using a urea formaldehyde resin in a typical instance, the curing cycle was five minutes, using temperatures of from approximately 240 to 260 degrees F. and pressures of approximately 200 pounds per square inch.

Using comparable materials to form comparable objects, the method and apparatus of the present invention permits, if desired, an increase in the pressures employed and a reduction in the total time required for completion of the curing cycle. Likewise, the present invention permits a greater flexibility in the curing cycle as the temperatures and pressures utilized may be varied relative to each other, since the pressure applying medium and the heating medium are controlled independently of one another.

In addition, the method and apparatus of the present invention permits greater control over the characteristics of the surfaces of the molded member since pressures are applied of a sufficient magnitude to prevent a waving, rippling, or warping of the surfaces which are in contact with the fixed surfaces of the die and the mandrel respectively.

Other objects of this invention will appear in the following description and appended claims, reference being had to the accompanying drawings forming a part of this specification wherein like reference characters designate corresponding parts in the several views.

In the drawings:

Fig. 2 is a fragmentary side elevation, partially in section, showing the said press in closed or curing position with a laminated structure shown in position between the mandrel and the sectional pressure applying die, the section shown being taken substantially on the staggered section line 2—2 in the direction of the arrows, Fig. 3.

Fig. 3 is a top plan of the press in closed position.

Fig. 4 is a top plan of a completed molded plywood frusto-conical packing box, the body portion of which has been formed in the apparatus and according to the method of the present invention.

Fig. 5 is a fragmentary vertical section taken substantially on the line 5—5 in the direction of the arrows, Fig. 4.

Fig. 6 is a side elevation of the packing box shown in Figs. 4 and 5 with parts broken away to show the laminar construction of the body portion.

Figure 1:
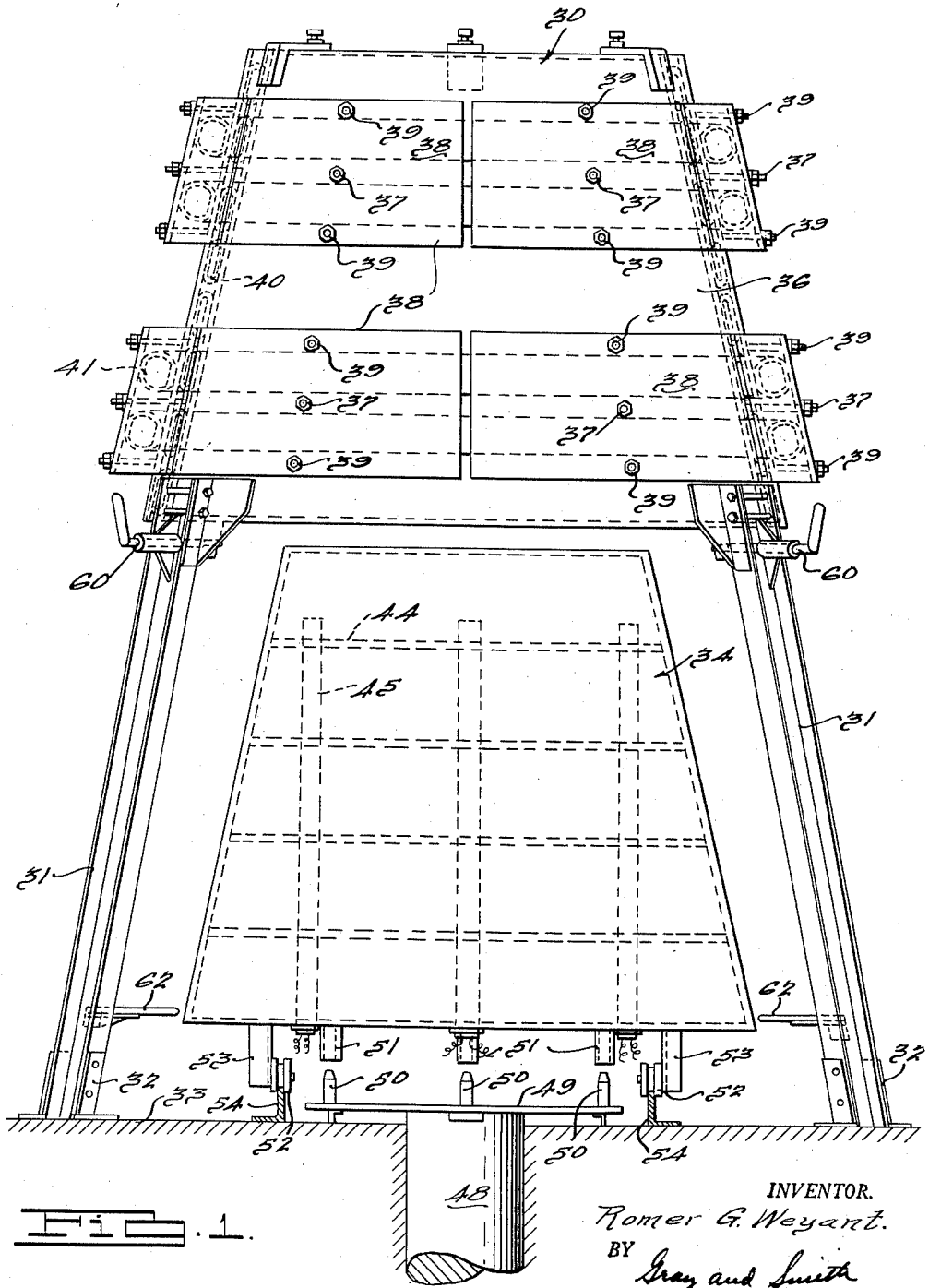
Fig. 1 is a side elevation showing the open or charging position of a press embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

According to the method of the present invention, a molded laminar structure may be made by coating separate thin layers of fibrous material, such as thin wood veneers, with a suitable heat curing adhesive or binder, such for example as a phenol formaldehyde partial condensation resin, a urea formaldehyde partial condensation resin, or a similar type of adhesive or binder which may be described generally as a thermo-setting resin. Such resins in a partially polymerized, liquefied or plastic condition may be used to coat the separate layers of the thin laminated material. The several layers which are required to make up the final laminated construction are then superimposed and subjected to heat and pressure for a sufficient time to cause the resins to polymerize, fuse and bond the respective laminations into a composite laminar structure.

The temperatures and pressures to be employed and the time required to complete the fusion or bonding operation will vary with the types of adhesive or binder employed, the types, thickness and number of the laminations utilized and the structural characteristics desired in the finished product.

The layers or laminations coated on adjacent surfaces with the adhesive or binding agent are superimposed one on the other to form a blank of the desired shape which is to be thereafter cured into the finished article. The sizes and shapes of the surfaces which determine the characteristics of the finished article are imparted to the uncured, laminated blank by placing the blank over a rigid supporting and forming mandrel, and applying a pressure between said mandrel and a mating sectional die member. Both the rigid and the mating sectional die are provided with rigid, inflexible, die surfaces which have been preformed to the desired contours of the finished article. Thus when pressure is exerted on the blank, it is forced to conform to the surface configurations of the rigid mandrel and to the die surfaces of the external sectional die member. Heat is preferably applied through the mandrel, or it may be applied through the sectional mating die as may be desired. Thus the laminated blank is subjected simultaneously to heat and pressures which are separately controlled and which may be varied relative to each other as may be required to secure the most advantageous curing cycle. In addition, by varying the pressures at various times during the curing cycle or by exerting fixed pressures of substantially greater magnitude than those which can be achieved in conventional processes using steam and a pressure autoclave, it is possible to impart exceptionally high weight-strength ratios to the molded laminar structure, and also to make such structure substantially impervious to moisture and relatively unaffected by the thermal conditions to which it may be subjected.

The method and apparatus of the present invention is shown in the drawings in connection with the manufacture of a laminated plywood frusto-conical shipping case. Such a case is used in large numbers for packing and shipping radial air-cooled internal combustion engines. Such a case is shown in Figures 4, 5 and 6 of the drawings and comprises a circular top rim 10 and a circular bottom rim 11 joined by a body portion 12 formed, in the present instance of three layers, 13, 14 and 15, of plywood strips bonded by a heat fused plastic binding material. As shown in Fig. 6 each of the layers 13, 14 and 15 is formed of a plurality of strips of plywood. The direction of the grain pattern in each layer is angularly disposed relative to the direction of the grain pattern of the next adjacent layer. In the present instance, as shown in Fig. 6, the strips forming the layer 16 extend between the bottom rim 11 and the top rim 10 with the direction of the grain pattern extending angularly upward to the left as viewed in Fig. 6. The strips forming the central layer 14 extend between the bottom rim 11 and the top rim 10 in a direction nearly vertical while the strips forming the inner layer 13 extend between the bottom rim 11 and the top rim 10 extending angularly upward to the right as viewed in Fig. 6.

The top rim 10 and the bottom rim 11 are each formed of a plurality of layers of spirally wound plywood strips which are united by a suitable heat fused plastic bonding material. Each of the rims 10 and 11 are provided with an angularly inclined face 16 which corresponds to the angular inclination of the faces of the body portion 12 at the points where the rims are affixed thereto. The rims 10 and 11 are secured to the body portion by any suitable means, as for example by gluing and nailing with the nails 17. The case is closed by a top member 18 removably secured to the rim 10 by a plurality of screws or other suitable fastening means 19. A bottom member 20 is removably secured to the bottom rim 11 by a plurality of screws or other suitable fastening means 21.

In the present embodiment, the rims 10 and 11 and the body portion 12 are formed separately and assembled as above described. However, it is within the scope of the present invention to unite the rims and the body portion to form a unitary article during the resin fusion process in forming the body portion 12 as hereinafter more fully described.

In a typical instance, using the press and method hereinafter described, layers, 13, 14 and 15 of the body portion 12 were each formed of plywood strips having a thickness of 3/8". The layers were bonded with an urea formaldehyde resin cured in a press of the present invention at a temperature of approximately 280 degrees F. in 10 minutes with pressures of approximately 155 pounds per square inch. The completed case was subjected to crushing strength tests and withstood loads in excess of 25,000 pounds without damage to the case.

In forming the body portion 12, the strips comprising the layers 13, 14 and 15 are coated with the selected heat fusing plastic glue and are assembled over suitable forms by tacking with metal staples or other suitable fastening means and is then cured for the proper time and at suitable temperatures according to the method of the present invention in the press shown in Figures 1, 2 and 3 of the drawings.

As here shown, the press comprises a sectional female die 30 mounted on a rigid frame 31 secured, as by the brackets 32 to the floor 33 or other rigid support. In the embodiment of the invention here shown, the sectional female die 30 surrounds a frusto-conical interior mating with the frusto-conical exterior surfaces of the mandrel 34. As shown in Fig. 3, the sectional female die 30 comprises six separately movable die sections 35. Each section 35 is located in the main die shell 36 by a plurality of locating members 37, each of which is rigidly secured, as by welding, to the die section 35. Each member 37 of the die sections 35, extends through the main die shell 36 and is slidably connected with an arcuate cross head member 38 connected by a plurality of locating studs 39 on the main die shell 36 of the sectional female die 30. The die sections 35 are spaced from the interior of the die shell 36 by a plurality of circumferentially extending pressure exerting members 40. The cross head members 38 are spaced from the exterior of the die shell 36 by a plurality of circumferentially extending pressure exerting members 41. The members 40 and 41 are suitably connected with a source (not shown) of pressure actuating fluid, as for example, compressed air or an hydraulic fluid.

The mandrel 34 is a hollow body filled with a suitable heat conducting fluid, as for example, a body of oil 43. The interior of the mandrel 34 is divided by a plurality of perforated baffles 44 to assure proper circulation of the heating fluid therethrough. A plurality of electrically actuated resistance heaters 45, of the fluid immersion type, are provided in the mandrel 34 to heat the body of heating fluid 43. The heaters 45 are each electrically connected by the lead wires 46 and 47, with a suitable heat control device and a source of electric power (not shown).

The mandrel 34 is movable vertically relative to the female sectional die 30 by an hydraulically actuated ram 48 having a cross head 49 on which is mounted a plurality of locating studs 50 which seat in a plurality of locating sleeves 51 located on the base of the mandrel 34. To permit access to the mandrel 34 for charging the press, the studs 50 are cleared of the sleeves 51 when the mandrel 34 is in the lowered position shown in Fig. 1. As shown, the mandrel 34 here rests on a plurality of rollers 52 carried on brackets 53 mounted on the base of the mandrel 34. The rollers 52 run on rails 54. By this construction, the entire mandrel 34 may be moved horizontally with respect to the sectional female die 30 so that the blank to be cured in the press can be easily placed on the mandrel 34 without interference by the sectional female die 30.

The mandrel 34 when in the raised position as shown in Fig. 2 is locked in position by adjustment of the mandrel locking members 60 (shown in Fig. 1). Pressures are exerted on a laminar blank 61 by the action of the ram 48 in moving the mandrel 34 into position in the die member 30. Pressure fluid is admitted to the pressure members 40 and a further pressure is exerted on the blank 61 during the curing cycle. When the curing cycle is completed, the supply of pressure fluid is cut off to the members 40 and is then supplied to the pressure members 41, which exert a pressure on the cross head 38 to move the die sections and break any contact they may have formed with the surface of the blank 61. This movement also accelerates the deflation of the members 40 and the return of the sectional die members 35 to their initial positions as shown in Fig. 1.

To facilitate stripping of the blank 61 from the mandrel 34, after its cure in the press, a plurality of fixed stripping members 62 are mounted on the rigid frame 31 and contact the bottom edge surface of the blank 61 as the mandrel 34 is brought to the lowered position shown in Fig. 1.

From the foregoing, it will be seen that a wide range of pressures may be exerted on the blank 61 during its curing by heat supplied through the mandrel 34.

It is to be understood that any desired type of laminated layers and any desired type of heat curing adhesive may be employed in carrying out the method of the present invention and the present method, therefore, is not limited in its use to particular materials. It is also to be understood that various types of press constructions may be employed and that various contours of mandrels and sectional dies may likewise be employed. Therefore, the invention is not limited to the particular form of apparatus herein disclosed.

In the construction here shown, the heat required for the bonding of the laminated article is supplied through the heated mandrel and the pressures are applied through the sections of the external die. It is to be understood, however, that heat may also be applied through the external die portions, if desired, and also it is to be understood that a sectional mandrel may be employed in instances where this is desirable and pressures may be applied to the work piece through such a sectional mandrel as well as through the external die, or, if desired, in place of, the application of pressures through the external die member.

It will be observed that in the embodiments of the invention here shown, heat and pressures are applied separately to the laminated work piece so as to provide a completed article having the desired weight-strength ratios, impermeability to moisture, elasticity, and resistance to thermal change. Any desired type of control mechanism may be employed for controlling the heat during the process. Such controls may be either thermostatically or manually controlled. The mandrel provides in each instance a supporting or forming surface over which the blank is placed. The mandrel is shaped to conform to the specified contour and dimension of the production item desired, and is built of any suitable material which will withstand the required bonding temperatures and pressures and which will have uniform heat conducting and radiating characteristics. The structural and mechanical design of the mandrel is determined by the size of the item to be produced and the method of pressure application to be employed. The method of heating the mandrel is optional so long as a constancy of measured temperature is achieved.

The sectional external dies are designed to furnish controlled pressure over the veneer blank and to cause the blank to conform to the surfaces of the mandrel as well as to the surfaces of the die. The thickness and number of the veneer plies as well as the shape and size of the item to be formed govern the structural and mechanical design of the die or dies. In all instances, however, the contour of the die or dies shall be held within controlled precision limits for seating over the material to be bonded and the mandrel surface is such as not to be deflected by the bonding pressures employed. The number of sectional dies employed and their actuating mechanism may be varied as may be required for particular applications in the light of production requirements.

While it is preferable that the veneer layers shall be preassembled using pregluing of the veneer layers, it is to be understood that this is not essential as the separate layers may, if desired, be placed over the mandrel one at a time and then, brought into place in the sectional external die and pressures are thereafter applied thereto. The bonding time, the charging of the press, and the release period are variable factors which depend primarily upon the type of adhesive employed, the type, thickness and number of veneer layers, the per cent of moisture content and the kind of material to be used in the veneer.

A wide variety of shapes and sizes of production items may be produced according to the present method, and such items will have a wide range of application for various commercial uses. A principal advantage of the present process is in all instances that increased bonding pressures may be obtained which will, if desired, considerably reduce the time required to complete the curing cycle. The use of such increased pressures also has produced greater structural strength-weight ratios than those obtained by other methods. This is particularly desirable in molded products designed for aircraft use or shipping containers where such increased weight-strength ratios are important factors. In addition, the present method permits controlled directional design of the veneers to be bonded so as to meet maximum stress requirements. This may be accomplished because of the range of die design which is possible. Also it is to be understood that various types of reinforcing or strengthening members may be bonded to and become an integral part of the completed molded work piece, if desired.

While I have here shown the use of structural members formed of laminated materials, such as plywood, it is to be understood that other types of structural members, such for example as metal, plastic or fabric materials, may also be similarly applied to and become a part of the articles as a result of carrying out of the present process.

I claim:

1. A veneer press including a sectional die, a horizontally movable mandrel for mating with said die, means for applying pressure to a laminar blank between said mandrel and said die, a ram engageable with said mandrel to move the latter vertically into operable position with said die, means for disengaging said ram from said mandrel when the latter is moved to its inoperative position, rail means upon which said mandrel is horizontally movable relative to said die to facilitate charging of the press, locating means for locating the mandrel on the ram when the latter is moved into engaged position with the mandrel and means for heating the laminar blank while held between said mandrel and said die.

2. A veneer press in accordance with claim 1 and further characterized in that said locating means includes a plurality of locating sleeves positioned on the lower side of said mandrel and a plurality of mating studs provided on the adjacent end of said ram.

3. A veneer press in accordance with claim 1 and further characterized in that the press is provided with a stripping member mounted on the die and engageable with a portion of the laminar blank as said mandrel is moved to its lowered position.

4. A veneer press including a frame, a sectional die mounted on said frame, a mandrel for supporting a laminar blank and adapted to be mated with said die and movable vertically relative thereto, means for applying pressure to a laminar blank positioned on said mandrel when said mandrel is mated with said die, a ram engageable with said mandrel to move the latter upward into operative position with said die, means above the ram in the lowermost position of the latter to support the mandrel when the latter and the ram are in their lowermost positions, a stripping member mounted on said frame and adapted to engage a portion of said laminar blank as said mandrel is moved into its lowered position and means for heating the laminar blank while held between the mandrel and said die.

ROMER G. WEYANT.

(References on following page)

REFERENCES CITED

The following references are of record in the file of this patent:

UNITED STATES PATENTS

| Number | Name | Date |
|---|---|---|
| 318,742 | Hotchkiss | May 26, 1885 |
| 430,905 | Westervelt | June 24, 1890 |
| 441,822 | Browning | Dec. 2, 1890 |
| 781,742 | Romunder | Feb. 7, 1905 |
| 1,039,887 | Bauroth | Oct. 1, 1912 |
| 1,564,848 | Herschede et al. | Dec. 8, 1925 |
| 1,954,183 | Schlesinger | Apr. 10, 1934 |
| 2,001,859 | Winchell | May 21, 1935 |
| 2,031,570 | Muller | Feb. 18, 1936 |
| 2,073,290 | Teague | Mar. 9, 1937 |
| 2,243,352 | Macdonald | May 27, 1941 |
| 2,279,820 | Hamilton | Apr. 14, 1942 |
| 2,286,267 | Farny | June 16, 1942 |
| 2,322,962 | Dickson et al. | June 29, 1943 |
| 2,363,779 | Duffy et al. | Nov. 28, 1944 |
| 2,370,322 | Nebesar | Feb. 27, 1945 |
| 2,370,956 | Harkom | Mar. 6, 1945 |
| 2,377,962 | Preston | June 12, 1945 |
| 2,417,226 | Weyant | Mar. 11, 1947 |